Sept. 15, 1959 D. LABINO 2,904,453
PIPE WRAP MATERIAL AND METHOD OF PRODUCING THE SAME
Filed Dec. 30, 1954 2 Sheets-Sheet 1
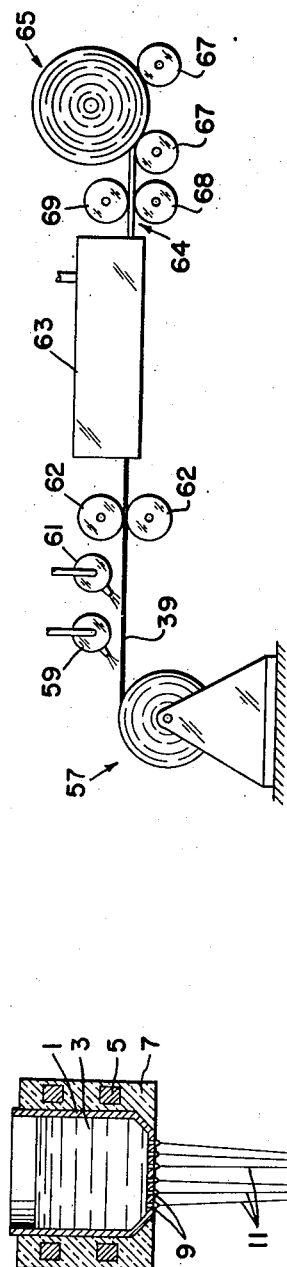
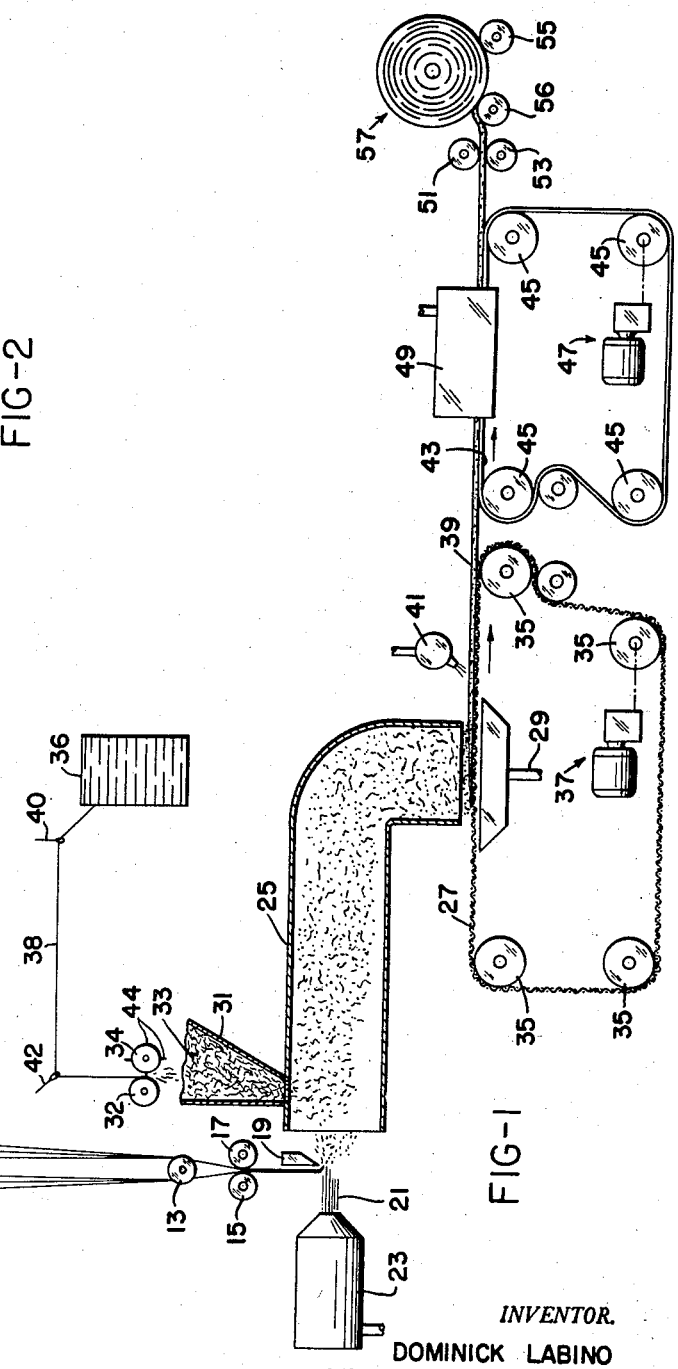
INVENTOR.
DOMINICK LABINO
BY Toulmin & Toulmin
ATTORNEYS Sept. 15, 1959   D. LABINO   2,904,453
PIPE WRAP MATERIAL AND METHOD OF PRODUCING THE SAME
Filed Dec. 30, 1954   2 Sheets-Sheet 2
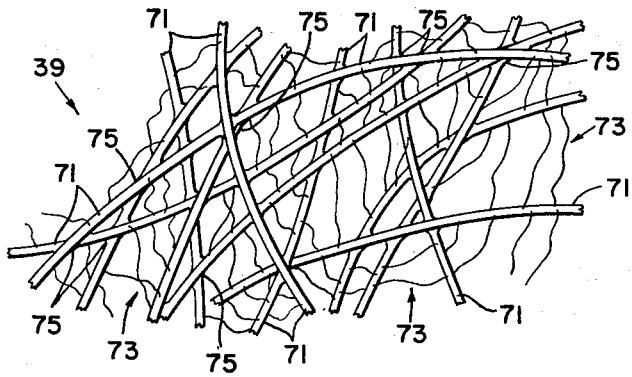
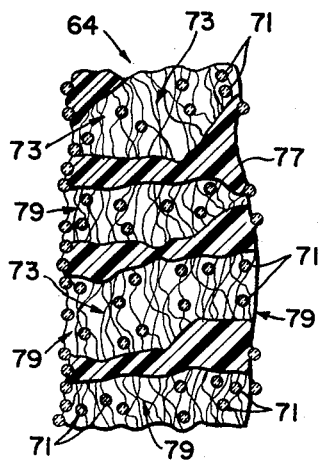
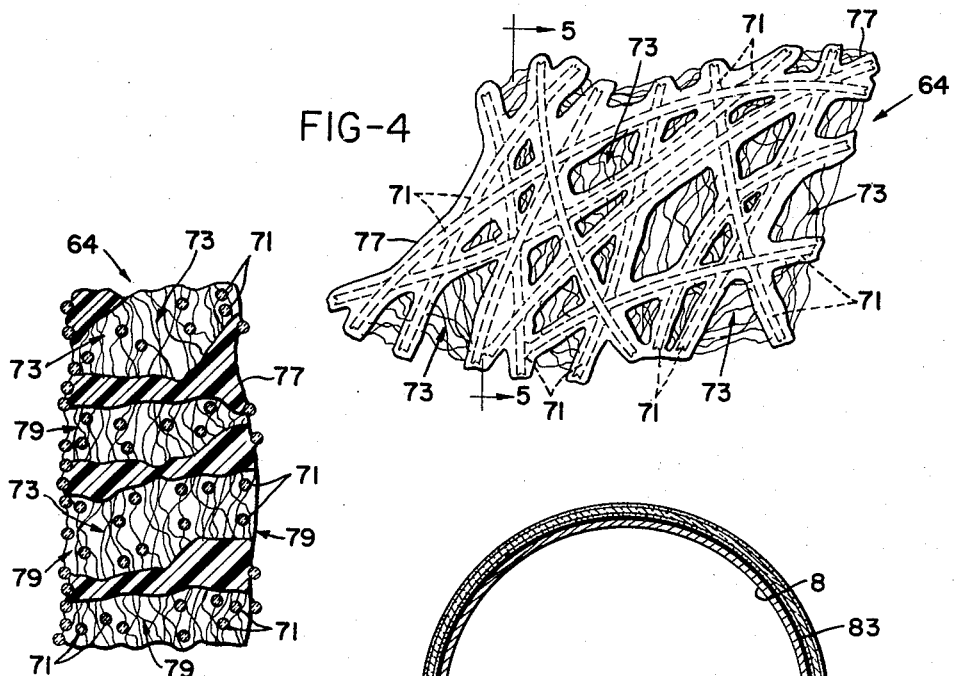
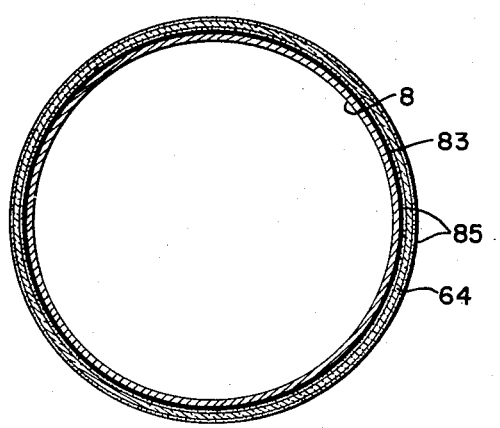
INVENTOR.
DOMINICK LABINO
BY Toulmin & Toulmin
ATTORNEYS

United States Patent Office 2,904,453
Patented Sept. 15, 1959

2,904,453

PIPE WRAP MATERIAL AND METHOD OF PRODUCING THE SAME

Dominick Labino, Toledo, Ohio, assignor, by mesne assignments, to L.O.F Glass Fibers Company, Toledo, Ohio, a corporation of Ohio Application December 30, 1954, Serial No. 478,756

18 Claims. (Cl. 117—126)

This invention relates to glass fiber mat products and most particularly to fibrous glass products which are useful as pipe wrap materials.

In the corrosion prevention of underground steel pipes, for example, a fine porous veil or tissue of glass filaments has hitherto been employed in the form of a broad tape; the pipes in the production operation are customarily first given a primer coat and then coated with a hot bituminous material; over this bituminous material the tape or veil of glass filaments is applied under tension and this forces the air bubbles out of the bitumen, thus integrating and reinforcing the bituminous film. The thin veil or tissue then has more bitumen applied over it and finally an outer wrap of a flexible rugged fabric is applied; the primary function of this outer wrap is to provide abrasion resistance to the assembly.

A primary object of the present invention is the provision of a glass fiber mat material which embodies the characteristics of porosity or openness of the tissue, ruggedness, and in addition exhibits a high absorptivity for the bituminous substances.

As hereinafter referred to in this application the bituminous substances may be considered to be asphaltic or coal tar products which may be heated to be rendered fluid in form for application to the pipes, such materials of themselves being well known in the art.

The new pipe wrap material permits the elimination of steps in the process of protecting the pipes, is relatively inexpensive and provides all the required functions of a pipe wrap material.

A particular object of the present invention is to describe a mat or sheet-like product of glass fibers which has or is adapted to receive a bituminous coating material thereon, and which mat may be supplied directly to a hot bituminized pipe to both force the air out of the bitumen and to afford physical protection to the pipe without requiring additional wrapping.

An important object of the invention is to describe a mat of glass fibers in sheet-like form comprised of relatively long filaments and relatively short micro fibers.

A principal object of the invention is to provide a novel process for the production of a sheet-like material for use in pipe wrapping.

I have found that a most suitable material for pipe wrapping is attained by mixing relatively long, large diameter filaments with micro size fibers in an air stream and collecting the fibers in mat or sheet-like form. The mat thus produced, I have found, has the micro fibers concentrated almost completely between bounding layers of the random arranged, loosely interlocked long, large diameter filaments. Some of the long filaments penetrate through and are interspersed in the body of the material and apparently interrupt the short fibers and produce porosity or openness through the material. The extent of such openness or porosity is dependent upon the proportion of micro fibers in the product.

The short micro fibers are produced by blowing glass filaments in a hot gaseous blast and such fibers are characterized by a diameter of one micron or less and a length of not greater than about ¼ of an inch. Fibers of ⅟₁₆ of an inch are highly suitable. Most generally the diameter of the fiber will lie in the range of ¾ to 1¼ microns. Such fibers are extremely flexible, soft and absorbent, and when employed as described above tend to concentrate between layers of the coarse filaments.

The long, relatively large diameter filaments are attained by drawing glass filaments in substantially parallel relation and combining the filaments as they are drawn, usually with the aid of a binder, into a bundle. The bundle may suitably comprise 204 of these parallel arranged filaments and a plurality of these bundles constitute a glass fiber roving.

The individual filaments are substantially continuous and preferably have a diameter in the range of 8 or 9 to 15 microns and should be of sufficient diameter to be flexible under service conditions of the material.

The rovings or yarns formed of the parallel arranged contacting filaments, in the practice of the invention, are chopped into lengths of between about 1 to 5 inches and are introduced into the hot gaseous blast in which the blown micro fibers are formed. The filaments, however, are introduced at a point where the heat of the blast has been dissipated to such an extent that it has no material effect upon the chopped filaments or yarns. The roving pieces however tend to open at their ends and are dispersed into filaments to some extent, which is advantageous as the bitumen later to be applied then adheres more readily to the small filaments.

The mat, in the process of formation thereof, has the small fibers drawn from the air blast concentrated centrally of the thickness of the mat between the random arranged longer filaments, as noted, and this apparently occurs because the small fibers tend themselves to adhere together and to pass readily around the longer filaments.

The longer filaments in contrast thereto as they strike the mat as it is forming have their passage inhibited by the gathering small fibers and apparently tend to concentrate at the surface of the mat, although some of these filaments under the influence of the blast penetrate through and are interspersed with the smaller fibers.

The mat after formation may be provided with a light binder to assist in retaining the mat integral preparatory to the application of a bituminized material, for example.

In a mat which has substantially only long filaments the mat is very open and bituminized material when applied thereto tends to flow along the filaments bonding the same together at their point of juncture, leaving wide open spaces between the filaments unbridged by the bituminous material. When however a proportion of as much as about 25 percent by weigth of micro fibers are included in the mat, the micro fibers tend to stiffen the product by holding the bitumen and to fill many of the spacings between the larger filaments and to render the spacings smaller.

The application of the bitumen occasions some bridging of the spacings between the smaller fibers although some few spacings remain open and the mat exhibits a definite porosity as well as absorptivity to the bitumen material.

As the proportion of micro fibers is increased to as much as 40 to 50 percent by weight of the mat, the openings become quite small through the mat and the same exhibits a high porosity as well as high absorptivity. With as much as 80 percent by weight of the micro fibers the mat is still highly absorptive and still sufficiently open and porous for the hot bituminous material to penetrate therethrough. A product having 40 to 50 percent by weight of the smaller fibers is preferred as the absorptivity and porosity are then both high; however the proportions may be varied with the particular bituminous material and the viscosity thereof.

The pipe wrap material of this invention is thus cribriform being perforated with numerous openings and the bituminous material which is generally applied during the course of manufacture is absorbed to some extent by the central body of fibers and also coats the longer filaments.

The invention will be more fully understood by reference to the following detailed description and accompanying drawings wherein:

Figure 1 is a schematic view of apparatus useful in the production of the mat of invention;

Figure 2 is a schematic view of apparatus for effecting bituminizing of the mat produced in the apparatus of Figure 1;

Figure 3 is a plan view of a phenolic bonded mat, unbituminized;

Figure 4 is a plan view of a bituminized mat, particularly illustrating openings through the mat;

Figure 5 is a cross sectional view of the structure of Figure 4 illustrating relatively long filaments above or below the centrally positioned micro fibers; and Figure 6 is a cross sectional view of a pipe with the pipe wrap material of invention thereon.

Referring to the drawings, there is shown in Figure 1 at 1 a crucible of platinum, for example, having a body 3 of molten glass retained therein. Induction heating coils supplied from a source (not shown) are indicated at 5 and are surrounded by heat insulation material 7.

The base of the crucible 1 is provided with nipples 9 through which the molten glass exudes to be formed into fine filaments 11. These filaments are drawn downwardly over a guide 13 by the action of a pair of rubber covered squeeze rolls 15, 17, one of which is driven, the filaments being solidified sufficiently upon their entry to the rolls to permit a light pressure on the glass to effect the drawing action.

The filaments passing through the drawing rolls 15, 17 are in substantially parallel relation and are presented over a knife edge guide 19 in this parallel relation to the hot gaseous blast 21 issuing from a burner 23. The fine filaments are rendered molten by the action of the gaseous blast and are attenuated thereby into micro fibers having a diameter which is preferably in the range of ¾ to 1¼ microns. These blown fibers are received in the conduit 25 the remote end of which exhausts onto a screen belt 27. Beneath the belt, as illustrated in Figure 1, there is provided a conduit 29 connected to a source of suction (not shown); this suction is effective to provide a low pressure at the surface of the belt 27 to attract the micro fibers thereto.

Also communicating with the conduit 25 and spaced well from the burner 23 is a hopper 31 through which filaments of glass in the form of chopped yarn bundles 33 are fed into the stream flowing in the conduit 25. These chopped bundles are constituted of filaments such as are illustrated at 11 in Figure 1.

The numeral 36 indicates a yarn package from which the strand 38 is fed through eyelets 40, 42 to the rolls 32, 34. Roll 32 is of soft rubber and roll 34 carries knives 44 which in the roll rotations cuts the bundles into suitable lengths.

The filaments of the chopped glass yarns are dispersed to a large extent by the turbulent gaseous blast in the conduit 25 and flow with the blown fibers to the belt 27. The yarn filaments are relatively long, preferably 1 to 5 inches in length, are somewhat flexible, but as compared with the short length micro fibers (up to ¼ of an inch) the chopped yarns are relatively inflexible.

Accordingly as the yarns and fibers strike the belt 27 the yarns tend to collect on both sides of the fine fibers and to retain the same and consequently there is a concentration of the small diameter fibers interiorly of the mat which is formed. The outer surface of the mat presents the appearance of random arranged yarn filaments and the side adjacent the belt usually has a greater proportion of the filaments.

The belt 27 is suitably mounted on pulleys indicated at 35 and is driven through a motor and gear box at 37. The mat is formed as shown at 39 and in the traverse of the belt, the mat is carried under a spray head 41 through which a phenolic binder issues to provide a light film of phenolic resin on the mat. The function of this phenolic resin is to bond the fibers of the mat together so that the same may be handled in the bituminizing operation, which will be described hereinafter.

Adjacent the belt 27 is a second belt 43 provided on pulleys 45 and having a gear box and motor indicated generally at 47. Enclosing the upper strand of the belt 43 is a heater indicated at 49 and the phenolic treated mat 39 passes through this heater to effect drying and setting of the resin on the mat. Thereafter, the mat passes through drawing rolls indicated at 51, 53, suitably wound on rotating rollers 55, 56, the roll being generally indicated at 57.

Referring now to Figure 2 the roll 57 may be bituminized immediately after the production of the bonded mat and for this purpose there is provided at 59, 61 spray heads through which an asphaltic material is sprayed onto the mat 39 as it is passed therebeneath, drawing rolls being provided at 62 to effect the movement of the mat.

The numeral 63 indicates an oven through which the asphaltic treated material passes and the solvent of the asphaltic mat is dried from the bonded mat by the action of the oven. The asphaltic mat is then wound into a roll indicated generally at 65, which roll is supported on oppositely rotatable driven rollers 66, 67, driven drawing rolls 68, 69 being provided for the passage of the mat through the oven.

Referring now to Figure 3 the numeral 39 indicates generally the phenolic bonded mat prior to the application of the asphaltic material. The longer filaments are indicated at 71, the short fibers at 73, and the phenolic binder, which is in very light film form on the mat, is indicated at 75.

In the structure of Figure 4 the mat indicated generally at 64 has been treated with the bituminous agent, which agent is indicated at 77. The remaining numerals are the same as in Figure 3.

The greatly enlarged cross sectional view of the mat of Figure 4, which is shown in Figure 5, illustrates that the short fibers 73 form a body within bounding random arranged filaments 71, and as will be noted from the figure the bituminous agent or asphalt 77 has penetrated to some extent and the porosity of the material is indicated by openings such as that at 79. The extent of the openings is decreased but the openings and porosity are not eliminated by increasing the quantity of micro fiber which tends to compact centrally of the structure shown in Figure 5, the openings being filmed across with bitumen at these higher proportions of micro fiber.

Referring now to Figure 6, in the application of the material of invention to a pipe, the pipe 81 is first given a primer coat indicated at 83 and thereafter hot bituminous material indicated at 85 is applied over the primer. The mat of this invention is then wound, under tension, in this hot bitumen and the hot bitumen permeates the core of the material, permitting any air or other gas trapped in the bitumen to escape, the bitumen at the same time being heavily absorbed into the body of fibers in the mat.

Thereafter the mat which is indicated by the numeral 64 is further lightly coated with hot bitumen and the pipe will in this condition be fully protected. The important features are that provision has been made for the escape of air from the area close to the pipe itself, the mat is sufficiently flexible to be formed easily about the pipe and is strong enough to resist tension by the equipment commonly used in such processes, and the mat effectively serves to resist abrasive action, for example, under positioning and service conditions of the assembly.

The product is particularly characterized by (a) a degree of flexibility such that the impregnated sheet may be bent upon itself without breakage, and (b) adsorptivity demonstrated by the fibers to the bituminous materials, a factor which greatly enhances the life of the product. A section of the sheet of fibers when cut through is blackened throughout the body indicating the high absorptivity.

It will be understood that this invention is susceptible to modification in order to adapt it to different usages and conditions and accordingly it is desired to comprehend such modifications within this invention as may fall within the scope of the appended claims.

I claim:

1. In a mat material, the combination in sheet form of an absorbent body of glass fibers and random arranged partially dispersed bundles of glass filaments of larger diameter and longer length than the fibers, the bundles of filaments bounding the fibers and extending to some extent through the body thereof to interrupt the continuity of the fibers and to define numerous openings through the material.

2. A pipe wrap material in the form of a cribriform sheet comprised of bundles of random arranged glass filaments of relatively large diameter and long length and absorbent glass fibers of a much smaller diameter and shorter length, the smaller diameter fibers being concentrated centrally of the thickness of the material and having some of the filaments interrupting the continuity of the fibers to provide openings through the material.

3. The combination, in a pipe wrap material of a body of fine glass fibers of short length in admixture with partially dispersed bundles of random arranged glass filaments of larger diameter and longer length than the fibers and having bitumen coated thereon, the bundles of filaments substantially completely bounding the absorbent body and some of the filaments extending through the body to interrupt the fibers and provide porosity in the material.

4. A pipe wrap material in the form of a cribriform sheet comprised of partially dispersed bundles of glass fibers of relatively large diameter and long length in admixture with randomly arranged glass fibers of smaller diameter and shorter length, the bundles of longer fibers forming open net means and the shorter randomly arranged fibers being concentrated centrally of the thickness of the material and bounded by the major portion of the bundles of longer fibers.

5. In a pipe wrap material, the combination of an absorbent body of glass fibers consisting of fibers in the micro diameter range and having lengths of not greater than about ¼ of an inch, and bundles of glass filaments bounding the body and interspersed therethrough to interrupt the fibers and provide openings through the material, the bundles of glass filaments consisting of filaments having lengths between about 1 to 5 inches and diameters in the range of 9 to 15 microns the fibers and bundles of filaments being coated with a bituminous material to fix them in spaced relation.

6. In a pipe wrap material, the combination of an absorbent body of glass fibers consisting of fibers in the micro diameter range and having lengths of not greater than about ¹⁄₁₆ of an inch, and bundles of glass filaments bounding the body and interspersed therethrough to interrupt the fibers and provide openings through the material, the bundles of glass filaments being in chopped glass yarn form and the yarn consisting of a plurality of filaments which have lengths of between about 1 to 5 inches and diameter in the range of 8 to 15 microns the fibers and bundles of filaments being coated with a bituminous material to fix them in spaced relation.

7. In a pipe wrap material, the combination of an absorbent body of glass fibers consisting of fibers in the micro diameter range and having lengths of not greater than about ¹⁄₁₆ of an inch, and bundles of glass filaments bounding the body and interspersed therethrough to interrupt the fibers and provide openings through the material, the bundles of glass filaments consisting of filaments having lengths between about 1 to 5 inches and diameters in the range of 8 to 15 microns, the body being impregnated with a bituminous material.

8. In a pipe wrap material, the combination of an absorbent body of glass fibers consisting of fibers having diameters in the range of ¾ to 1¼ microns and having lengths of not greater than about ¼ of an inch, and bundles of glass filaments bounding the body and interspersed therethrough to interrupt the fibers and provide openings through the material, the bundles of glass filaments having lengths between about 1 to 5 inches and diameters in the range of 9 to 15 microns the fibers and bundles of filaments being coated with a bituminous material to fix them in spaced relation.

9. A cribriform pipe wrap material in sheet form comprising, an absorbent body of individual short micro diameter glass fibers, filaments of greater length bounding the body and extending therethrough to provide openings through the sheet, the filaments being in chopped roving form, and a bonding agent binding the filamentary rovings and fibers together.

10. In a process for forming a fibrous mat the steps of providing a gaseous blast, admixing in the blast individual short micro diameter fibers and bundles of relatively long larger diameter filaments, and collecting the bundles of filaments and fibers simultaneously on a collecting surface to provide a mat in which the short individual fibers are concentrated centrally of the thickness of the mat and in which the bundles of long larger diameter filaments generally surround the mat.

11. In a method of producing pipe wrap material the steps of providing a hot gaseous blast, introducing glass filaments into the blast to soften and attenuate the same to micro fibers, introducing into the blast carrying the micro fibers bundles of longer glass filaments, collecting on a surface simultaneously the admixed bundles of filament and fibers to provide a mat having the short fibers concentrated centrally of the mat and also having porosity therein, and thereafter absorbing into the mat hot bitumen.

12. A fibrous mat comprising, a fibrous admixture of 20% to 80% by weight of blown glass fibers of a diameter not exceeding 1.5 microns, the remainder of the mixture containing partially dispersed bundles of chopped continuous glass filaments having a length in the range of from 1 to 5 inches and a diameter in the range from 9 to 15 microns, and a coating of thermosetting resin on all of the fibers and filaments to bond the same into a coherent mass.

13. A cribriform fibrous mat comprising, an absorptive body of blown glass fibers of short length and of a diameter not exceeding 1.5 microns, said absorptive fibers having admixed therewith bundles of chopped continuous glass filaments of a length in the range from 1 to 5 inches, and a coating of thermosetting resin on all of the fibers and filaments to bond the same into a coherent mass.

14. A method of producing fibrous mats including the steps of admixing in a gaseous blast individual glass fibers of a diameter of about 1 micron and of short length and bundles of glass filaments of a length greater than the individual fibers, collecting the admixed fibers and bundles of filaments from the blast in mat form, and coating the mat with a bonding agent to fix the relative relation between the fibers and bundles of filaments.

15. A method of producing fibrous mats as defined in claim 18, which includes the step of impregnating the mat with a bituminous bonding agent.

16. A fibrous mat comprising an admixture of individual glass fibers of fine diameter and short length with partially dispersed bundles of larger diameter filaments having lengths in the range from 2 to about 5 inches.

17. A fibrous mat as defined in claim 20, wherein the fine fibers and partially dispersed bundles of filaments are held in relatively fixed relation by a bonding material coated over the surfaces thereof.

18. A cribriform sheet material comprising, an admixture of short randomly arranged individual glass fibers of a diameter of approximately 1 micron and partially dispersed bundles of lengths of continuous filaments, and a bituminous binder absorbed into the sheet and coating the fibers and bundles of filaments and bonding them in relatively fixed relation.

References Cited in the file of this patent

UNITED STATES PATENTS

| | | |
|---|---|---|
| 2,057,393 | Powell | Oct. 13, 1936 |
| 2,331,146 | Slayter | Oct. 5, 1943 |
| 2,523,759 | Grant | Sept. 26, 1950 |
| 2,574,849 | Talalay | Nov. 13, 1951 |
| 2,751,962 | Drummond | June 26, 1956 |

UNITED STATES PATENT OFFICE
CERTIFICATION OF CORRECTION

Patent No. 2,904,453                September 15, 1959

Dominick Labino

It is hereby certified that error appears in the above numbered patent requiring correction and that the said Letters Patent should read as corrected below.

Column 2, line 52, for "weigth" read -- weight --; column 6, line 72, for the claim reference numeral "18" read -- 14 --; column 7, line 3, for the claim reference numeral "20" read -- 16 --.

Signed and sealed this 29th day of August 1961.

(SEAL)
Attest:

ERNEST W. SWIDER                          DAVID L. LADD
Attesting Officer                           Commissioner of Patents